(12) United States Patent
Miyasaki

(10) Patent No.: US 9,332,740 B2
(45) Date of Patent: May 10, 2016

(54) FISH TANK FOR ALLOWING AQUARIUM FISH TO BE VIEWED CLEARLY FROM THE TOP

(75) Inventor: Reiichi Miyasaki, Yamanashi (JP)

(73) Assignee: Kabusikigaisha Spring, Yamanashi (JP)

( * ) Notice: Subject to any disclaimer, the term of this patent is extended or adjusted under 35 U.S.C. 154(b) by 0 days.

(21) Appl. No.: 14/127,269

(22) PCT Filed: Jun. 19, 2012

(86) PCT No.: PCT/JP2012/066448
§ 371 (c)(1),
(2), (4) Date: Dec. 18, 2013

(87) PCT Pub. No.: WO2013/011814
PCT Pub. Date: Jan. 24, 2013

(65) Prior Publication Data
US 2014/0137807 A1    May 22, 2014

(30) Foreign Application Priority Data

Jun. 21, 2011 (JP) .................................. 2011-151274

(51) Int. Cl.
*A01K 63/00* (2006.01)

(52) U.S. Cl.
CPC .................................... *A01K 63/003* (2013.01)

(58) Field of Classification Search
CPC ... A01K 63/003; A01K 63/006; A01K 63/04; A01K 63/06; A01K 63/00; A01K 63/02; A01K 63/045; A01K 63/047
USPC .......................... 119/265, 245, 246, 247, 269
See application file for complete search history.

(56) References Cited

U.S. PATENT DOCUMENTS

| | | | | |
|---|---|---|---|---|
| 3,699,921 A | * | 10/1972 | Janicek | 119/246 |
| 3,807,356 A | | 4/1974 | Pratt | |
| 5,445,112 A | * | 8/1995 | Grosman | 119/265 |
| 5,479,884 A | * | 1/1996 | Grosman | 119/265 |
| 5,832,871 A | * | 11/1998 | Leis | 119/269 |
| 7,421,976 B1 | | 9/2008 | Travers | |
| 2008/0105210 A1 | | 5/2008 | Perry | |
| 2009/0107411 A1 | * | 4/2009 | Yu | 119/265 |

(Continued)

FOREIGN PATENT DOCUMENTS

| | | |
|---|---|---|
| CN | 2 738 629 | 11/2005 |
| CN | 201 111 352 | 9/2008 |

(Continued)

OTHER PUBLICATIONS

Notification of Reason of Refusal issued Oct. 22, 2013 in corresponding Japanese Application No. 2011-151274 (with English translation).

(Continued)

*Primary Examiner* — Trinh Nguyen
(74) *Attorney, Agent, or Firm* — Wenderoth, Lind & Ponack, L.L.P.

(57) ABSTRACT

Hitherto, when viewing from above, it has been impossible to view aquarium fish clearly due to disturbances on the water surface. Provided is an improvement method, including a manufacturing method, that makes it possible to view aquarium fish clearly from above. Adopting a structure in which overflowing water flows into an upper gutter makes it possible to view aquarium fish clearly from above for long periods of time.

4 Claims, 3 Drawing Sheets

(56) References Cited

U.S. PATENT DOCUMENTS

| | | | |
|---|---|---|---|
| 2009/0199779 A1* | 8/2009 | Parks | 119/247 |
| 2010/0116177 A1 | 5/2010 | Young | |

FOREIGN PATENT DOCUMENTS

| | | |
|---|---|---|
| CN | 201 383 992 | 1/2010 |
| FR | 2 465 413 | 3/1981 |
| FR | 2 472 339 | 7/1981 |
| FR | 2 546 374 | 11/1984 |
| JP | 60-101945 | 7/1985 |
| JP | 5-211829 | 8/1993 |
| JP | 5-91318 | 12/1993 |
| JP | 2001-136862 | 5/2001 |
| JP | 2010-022351 | 2/2010 |
| KR | 10-2009-0014911 | 2/2009 |
| WO | 2010/010960 | 1/2010 |

OTHER PUBLICATIONS

Concise explanation of relevance for JP unexamined utility model publication No. 5-91318, which issued Dec. 14, 1993.

Concise explanation of relevance for JP unexamined patent publication No. 5-211829, which issued Aug. 24, 1993.

Concise explanation of relevance for JP unexamined utility model publication No. 60-101945, which issued Jul. 11, 1985.

International Search Report issued Mar. 5, 2013 in corresponding International Application No. PCT/JP2012/066448.

Australian Notice of Acceptance dated Apr. 30, 2014 issued in Australian Patent Application No. 2012285183.

* cited by examiner

FISH TANK FOR ALLOWING AQUARIUM FISH TO BE VIEWED CLEARLY FROM THE TOP

TECHNICAL FIELD

The present invention relates to a fish tank for aquarium fish.

BACKGROUND ART

Conventionally, majority of fish tank is designed to view aquarium fish, such as tropical fish, aquarium fish, or goldfish, from the side. Besides, a conventional fish tank for viewing fish from the top (Japan Utility Model Publication No. 1993 (Heisei 5)-91318) has a gap between the water surface and a top plate and, therefore, suffers from diffuse reflection resulting from, for example, waves on the water surface, making it impossible to view fish clearly. As a fish tank disclosed in Japan Patent Application No. 1992 (Heisei 4)-47528 has a convex table top plate, there exists a problem in practical use, such as high manufacturing cost. For viewing aquarium fish clearly from the fish-tank there are several problems as mentioned above so that a demand for improvement is required.

PRIOR ART LITERATURE

Patent Literature 1: Japan Utility Model Publication No. 1993 (Heisei 5)-91318
Patent Literature 2: Japan Patent Application No. 1992 (Heisei 4)-47528

SUMMARY OF INVENTION

Problems to be Solved by the Invention

Water leakage problem arising from deteriorated packing, led by the means of eliminating the gap between the water surface and the top plate glass; a problem in that water may flow out of an upper gutter due to vibrations by earthquake or others; and a problem in that air bubbles remain between the top plate and the water surface.

Solutions to Problems

Instead of using packing, which easily deteriorates, a structure as shown in FIGS. 1 and 2 is provided, in which an upper gutter is formed all the way around the periphery of a fish tank. With this structure, water and air flow suitably in a viewing tank and water flows through the upper gutter. To prevent water from flowing out of the viewing tank, which may be caused by vibration, a return plate is attached as shown in FIG. 3. Additionally, to solve the problem of air bubbles remaining in the viewing tank, the top of the upper gutter is inclined 1 to 10 degrees, thus making it easier to remove air bubbles by virtue of negative pressure resulting from the water level difference.

Advantageous Effects of Invention

The present invention makes it possible to view the inside of the fish tank clearly even from top. Since the fish tank does not use packing, periodical replacement of packing is obviated. Additionally, even if waves occur in the upper gutter by vibration, water is prevented from flowing out of the fish tank easily.

DETAILED DESCRIPTION OF THE INVENTION

Figure 5:
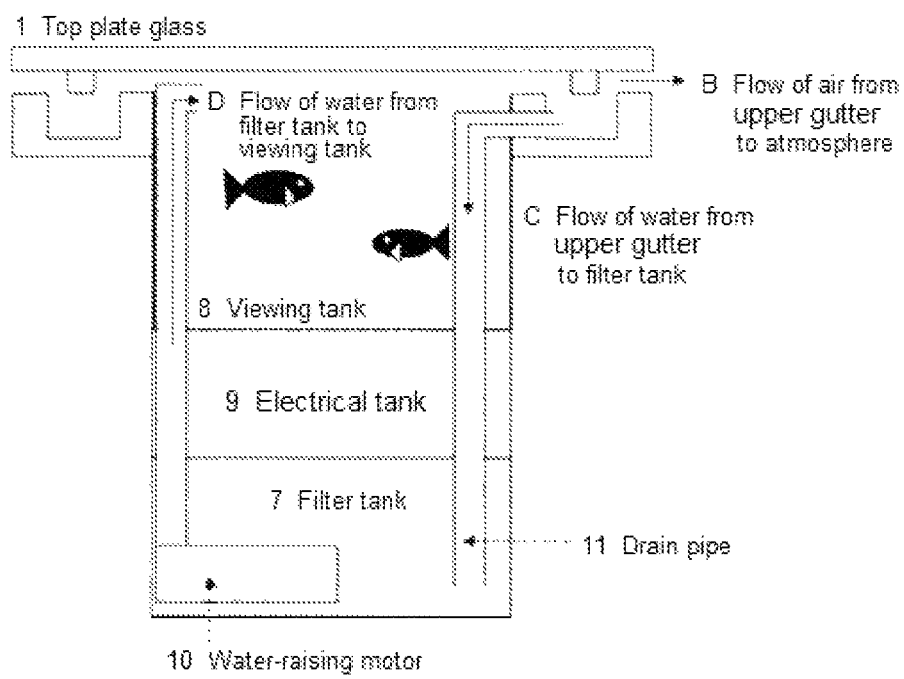
FIG. 5 is a side cross-sectional view of the present invention, illustrating one embodiment thereof.

As the best form of the present invention, FIG. 5 shows a water circulation structure in which water flowing out of a viewing tank flows in an upper gutter, further flows into a filter tank from a drain pipe, and is carried into the viewing tank again by a water-raising pump in the filter tank. In an electric tank, electric equipment such as a water-raising motor can be accommodated.

Embodiment 1

Figure 1:
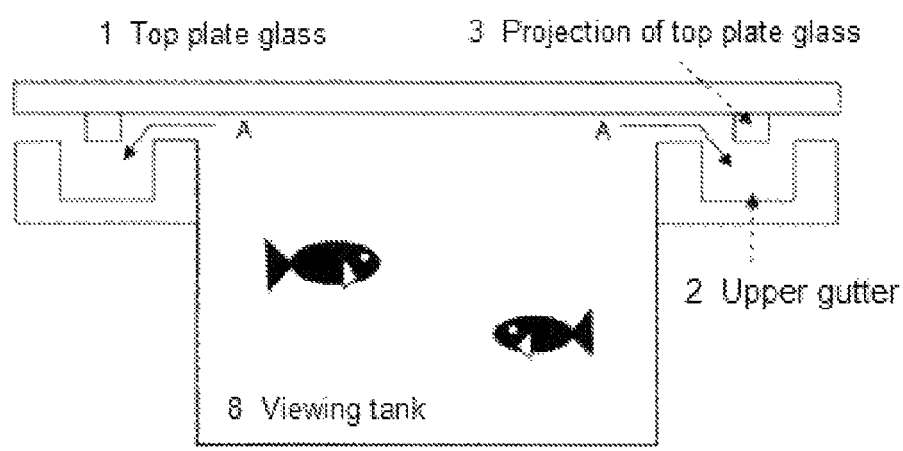
FIG. 1 is a side cross-sectional view of the present invention, illustrating a structure to prevent entry of air bubbles.
Figure 2:
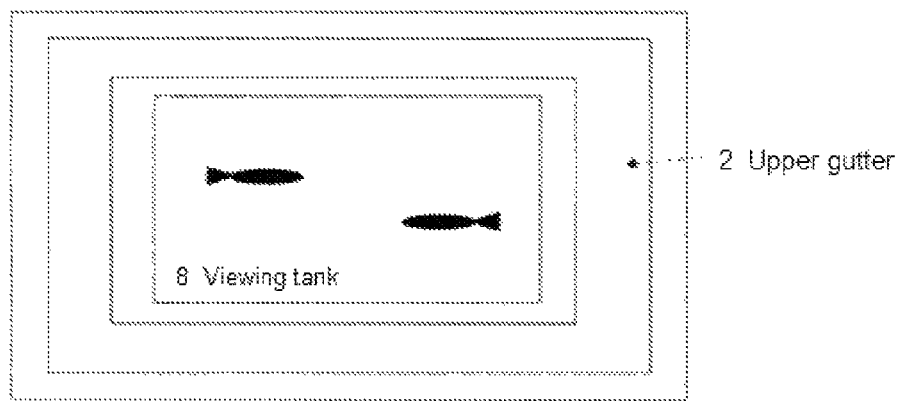
FIG. 2 is a top plan view of the present invention, illustrating a structure to prevent entry of air bubbles.

In the structure in which aquarium water, with which a viewing tank 8 is filled, flows into an upper gutter 2 from directions indicated by arrows A, shown in FIG. 1, the projection 3 of the top plate glass 1 receives aquarium water flowing out of the viewing tank 8. In FIG. 5, aquarium water is carried to the viewing tank 8 by a water-raising motor 10 provided in a filter tank 7. Water flowing out of the viewing tank 8 flows through the upper gutter 2, and returns from a drain pipe 11 to the filter tank 7, thus circulating water is created. As long as the water-raising motor 10 is in operation, the viewing tank 8 is kept full of water. By placing the top plate glass 1 on the viewing tank 8, the water surface and the top plate glass 1 come into close contact with each other, thus making it possible to view the inside of the tank clearly. In an Electrical tank 9, electric equipment can be accommodated.

Embodiment 2

Figure 3:
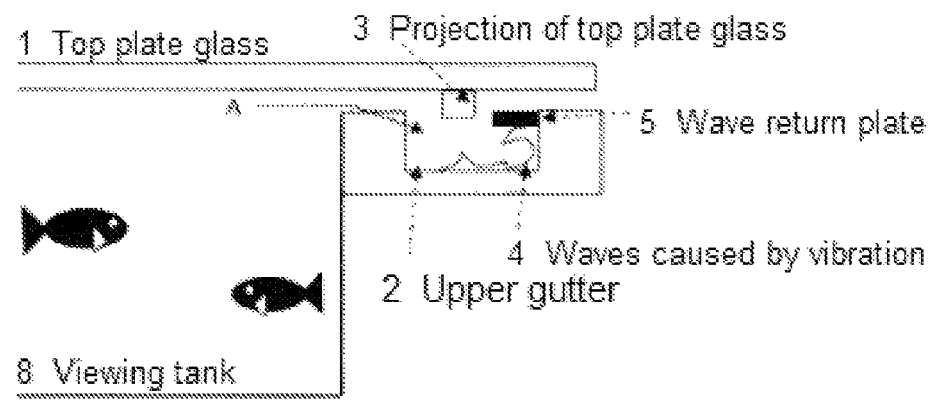
FIG. 3 is a side cross-sectional view of the present invention, illustrating a structure to prevent water from flowing out of the fish tank even in the event of vibration.

In FIG. 3, a wave return plate 5 is provided to make water less likely to flow out of an upper gutter 2 even if waves caused by vibration 4 occur.

Embodiment 3

Figure 4:
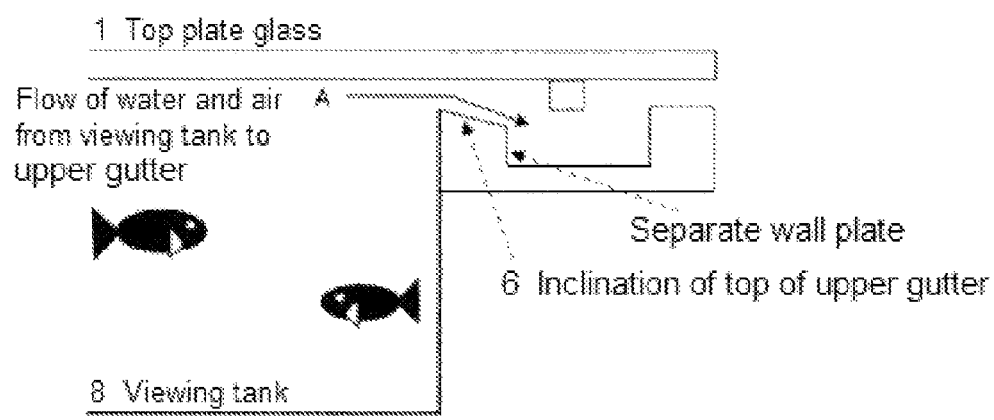
FIG. 4 is a side cross-sectional view of the present invention, illustrating a structure to remove air bubbles.

In FIG. 4, air bubbles under the top plate glass 1 are easily removed by the water level difference made by a 1-10-degree gentle inclination of the top of an upper gutter 6.

Embodiment 4

Connecting a plurality of drain pipes 11 or increasing the thickness of diameter of the drain pipe 11 can cope with an increase in the size of a fish tank.

INDUSTRIAL APPLICABILITY

Since the fish tank is designed so that the inside of it can be viewed clearly from the top, this fish tank can be used as a table. Also, a fish tank according to the present invention can be embedded in a floor and viewed from above.

REFERENCE SIGNS LIST

1 Top plate glass
2 Upper gutter
3 Projection of top plate glass
4 Waves caused by vibration
5 Wave return plate
6 Inclination of top of upper gutter
7 Filter tank
8 Viewing tank
9 Electrical tank
10 Water-raising motor
11 Drain pipe
Solid line arrow A Flow of water and air from viewing tank to upper gutter
Solid line arrow B Flow of air from upper gutter to atmosphere
Solid line arrow C Flow of water from upper gutter to filter tank
Solid line arrow D Flow of water from filter tank to viewing tank

The invention claimed is:

1. A fish tank for viewing aquarium fish clearly from the top, comprising:
   a viewing tank for receiving aquarium water;
   an upper gutter provided on a perimeter of an uppermost part of the viewing tank for receiving water overflowing from the viewing tank;
   a transparent top plate arranged on the viewing tank so as to come into direct contact with the surface of water in the viewing tank, the top plate having a projection which extends into the upper gutter so as to retain the overflowing water within the upper gutter, wherein no opening is formed in the top plate;
   a filter tank comprising a water-raising pump for supplying water to the viewing tank;
   a drain pipe having a first end connected to the gutter and a second end connected to the filter tank; and
   a pipe having a first end connected to the water-raising pump and a second end connected to the viewing tank.

2. The fish tank claimed in claim 1, further comprising a plate arranged within a passage of the upper gutter, the plate being configured to prevent water from flowing out of the upper gutter even in the event of vibration due to an earthquake.

3. The fish tank claimed in claim 1, wherein a top brim of a separate wall plate being a viewing tank side of the upper gutter is formed to be gently inclined approximately 1 to 10 degrees, by which flowing of water to the upper gutter from the viewing tank is promoted and air bubbles under the transparent top plate are removed.

4. The fish tank claimed in claim 2, wherein a top brim of a separate wall plate being a viewing tank side of the upper gutter is formed to be gently inclined approximately 1 to 10 degrees, by which flowing of water to the upper gutter from the viewing tank is promoted and air bubbles under the transparent top plate are removed.

* * * * *